United States Patent
Dunik et al.

(10) Patent No.: US 10,018,729 B2
(45) Date of Patent: Jul. 10, 2018

(54) SELECTED ASPECTS OF ADVANCED RECEIVER AUTONOMOUS INTEGRITY MONITORING APPLICATION TO KALMAN FILTER BASED NAVIGATION FILTER

(71) Applicant: Honeywell International Inc., Morris Plains, NJ (US)

(72) Inventors: Jindrich Dunik, Plzen (CZ); Martin Orejas, Brno (CZ); Zdenek Kana, Dubnany (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/406,189

(22) Filed: Jan. 13, 2017

(65) Prior Publication Data

US 2017/0131407 A1  May 11, 2017

Related U.S. Application Data (62) Division of application No. 13/850,341, filed on Mar. 26, 2013, now Pat. No. 9,547,086.

(51) Int. Cl.
*G01S 5/14* (2006.01)
*G01S 19/20* (2010.01)

(52) U.S. Cl.
CPC .................... *G01S 19/20* (2013.01)

(58) Field of Classification Search
CPC .......... G01S 19/20; G01S 5/009; G01S 19/47; G01C 21/165

(Continued)

(56) References Cited

U.S. PATENT DOCUMENTS 5,760,737 A * 6/1998 Brenner ............... G01C 21/165
                                              342/357.58
5,867,411 A * 2/1999 Kumar .................... G01S 19/04
                                              375/232

(Continued)

FOREIGN PATENT DOCUMENTS

| CN | 101806903 | 8/2010 |
|----|-----------|--------|
| EP | 1729145   | 12/2006 |

OTHER PUBLICATIONS

European Patent Office, "Office Action from EP Application No. 14150944.8 dated Oct. 6, 2015", "from Foreign Counterpart of U.S. Appl. No. 13/850,341", dated Oct. 6, 2015, pp. 1-8, Published in: EP.

(Continued)

*Primary Examiner* — Bernarr E Gregory
*Assistant Examiner* — Nuzhat Pervin
(74) *Attorney, Agent, or Firm* — Fogg & Powers LLC (57) ABSTRACT

A method of advanced receiver autonomous integrity monitoring of a navigation system is discussed and two modifications facilitating its implementation in a hybrid navigation system are disclosed. In the first approach, relations describing the effect of unmodeled biases in pseudo-measurement on the Kalman filter state estimate are analytically derived and their incorporation into the integrity monitoring algorithm is described. The method comprises receiving a plurality of signals transmitted from space-based satellites, determining a position full-solution and sub-solutions, specifying a pseudorange bias, computing a transformation matrix for the full-solution and all sub-solutions using a Kalman filter, computing a bias effect on an error of filtered state vectors of all sub-solutions, and adding the effect to computed vertical and horizontal protection levels. In the second approach, a modification for computationally effective calculation of the protection levels of hybrid navigation (Continued)

systems based on both integrity and non-integrity assured pseudorange error descriptions is disclosed.

17 Claims, 4 Drawing Sheets

(58) Field of Classification Search
USPC .................................................... 342/357.58
See application file for complete search history.

(56) References Cited

U.S. PATENT DOCUMENTS

| | | | |
|---|---|---|---|
| 5,923,286 | A | 7/1999 | Divakaruni |
| 5,926,132 | A | 7/1999 | Brenner |
| 5,969,672 | A | 10/1999 | Brenner |
| 6,417,802 | B1 | 7/2002 | Diesel |
| 6,639,549 | B2* | 10/2003 | Vanderwerf ............ G01S 19/20 342/357.58 |
| 6,760,663 | B2* | 7/2004 | Brenner .................. G01S 5/009 342/357.48 |
| 6,864,836 | B1 | 3/2005 | Hatch et al. |
| 7,219,013 | B1* | 5/2007 | Young .................. G01C 21/165 342/357.58 |
| 7,409,289 | B2 | 8/2008 | Coatantiec |
| 7,436,354 | B2 | 10/2008 | Lee |
| 7,711,482 | B2 | 5/2010 | Coatantiec et al. |
| 7,783,425 | B1 | 8/2010 | Hwang et al. |
| 7,911,380 | B2 | 3/2011 | Petillon |
| 7,956,802 | B1 | 6/2011 | Hwang et al. |
| 8,014,948 | B2* | 9/2011 | Vanderwerf ............ G01S 19/20 342/357.59 |
| 8,019,539 | B2 | 9/2011 | Vanderwerf |
| 8,131,463 | B2 | 3/2012 | Lopez et al. |
| 8,629,805 | B2* | 1/2014 | Pulford .................. G01S 19/20 342/357.58 |
| 8,976,064 | B2 | 3/2015 | Brenner |
| 9,341,718 | B2* | 5/2016 | Vanderwerf ............ G01S 19/20 |
| 2001/0020214 | A1* | 9/2001 | Brenner .................. G01S 5/009 701/470 |
| 2009/0182493 | A1 | 7/2009 | McDonald et al. |
| 2009/0182494 | A1 | 7/2009 | McDonald et al. |
| 2009/0182495 | A1 | 7/2009 | McDonald et al. |
| 2010/0324822 | A1* | 12/2010 | Coatantiec .............. G01S 19/20 701/472 |
| 2011/0084874 | A1 | 4/2011 | Coatantiec |
| 2011/0084878 | A1 | 4/2011 | Riley et al. |
| 2011/0316737 | A1 | 12/2011 | Trautenberg |
| 2012/0019411 | A1 | 1/2012 | Trautenberg |
| 2012/0146851 | A1 | 6/2012 | Fernandez |
| 2014/0097984 | A1* | 4/2014 | Stevens .................. G01S 19/20 342/357.58 |
| 2014/0292574 | A1 | 10/2014 | Dunik et al. |
| 2015/0145724 | A1 | 5/2015 | Kana et al. |
| 2017/0131407 | A1 | 5/2017 | Dunik et al. |

OTHER PUBLICATIONS

European Patent Office, "Partial EP Search Report from EP Application No. 14150944.8 dated May 11, 2015", "from Foreign Counterpart of U.S. Appl. No. 13/850,341", dated May 11, 2015, pp. 1-6, Published in: EP.
European Patent Office, "European Search Report from EP Application No. 14150944.8 dated Sep. 18, 2015", "from Foreign Counterpart of U.S. Appl. No. 13/850,341", dated Sep. 18, 2015, pp. 1-5, Published in: EP.
United States Patent and Trademark Office, "Advisory Action", "from U.S. Appl. No. 13/850,341", dated Jun. 17, 2016, p. 4 Published in: US.
United States Patent and Trademark Office, "Final Office Action", "from U.S. Appl. No. 13/850,341", dated Mar. 18, 2016, p. 23 Published in: US.
United States Patent and Trademark Office, "Notice of Allowance", "from U.S. Appl. No. 13/850,341", dated Sep. 7, 2016, p. 13 Published in: US.
United States Patent and Trademark Office, "Notice of Publication", "U.S. Appl. No. 13/850,341", dated Oct. 2, 2014, p. 1 Published in: US.
United States and Patent and Trademark Office, "Office Action", "from U.S. Appl. No. 13/850,341", dated Sep. 4, 2015, p. 27, Published in: US.
European Patent Office, "Partial European Search Report from EP Application No. 14190750.1 dated May 8, 2015", "from Foreign Counterpart of U.S. Appl. No. 14/092,454", dated May 8, 2015, pp. 1-5, Published in: EP.
European Patent Office, "Extended European Search Report from EP Application No. 14190750.1 dated Nov. 17, 2015", "from Foreign Counterpart of U.S. Appl. No. 14/092,454", dated Nov. 17, 2015, pp. 1-13, Published in: EP.
U.S. Patent and Trademark Office, "Office Action", "U.S. Appl. No. 14/092,454", dated Aug. 26, 2016, pp. 1-27, Published in: US.
Blanch et al., "An Optimized Multiple Hypothesis RAIM Algorithm for Vertical Guidance", "Proceedings of the 20th International Technical Meeting of the Satellite Division of the Institute of Navigation", Sep. 2007, pp. 2924-2933.
Brenner, Mats, "Integrated GPS/Intertial Fault Detection Availability", "Navigation: Journal of the Institute of Navigation", Mar. 1996, pp. 339-358, vol. 43, No. 2, Publisher: Institute of Navigation, Published in: US.
Choi et al., "Demonstrations of Multi-Constellation Advance RAIM for Vertical Guidance using GPS and GLONASS Signals", Jan. 1, 2011, pp. 1-8, Publisher: Proceedings of ION GNSS 2011, Published in: Portland, OR.
Escher et al., "GNSS/IRS Hybridization: Fault Detection and Isolation of More than One Range Failure", "Proceedings of the Institute of Navigation GPS 2002", Sep. 24-27, 2002, pp. 2619-2629, Published in: Portland, OR.
"Phase II of the GNSS Evolutionary Architecture Study", Feb. 2010, pp. 1-122, Publisher: http://www.faa.gov/about/office_org/headquarters_offices/ato/service_units/techops/navservices/gnss/library/documents/media/GEASPhaseII_Final.pdf.
Greenspan, "GPS and Inertial Integration", "Global Positioning System: Theory and Applications", Jan. 1, 1996, pp. 187-194, vol. II.
Jiang et al., "Optimization of the Multiple Hypotheses Solution Spearation RAIM Method", "Proceedings of the 25th Int. Tech. Meeting of the Satellite Division of the U.S. Inst. of Navigation", Sep. 18-21, 2012, pp. 228-234, Published in: US.
Kana et al., "Architectures for High Integrity Multi-Constellation Solution Separation", "Proceedings of the 27th International Technical Meeting of the ION Satellite Division, ION GNSS+ 2014, Sep. 8-12, 2014", Sep. 1, 2014, pp. 3554-3565.
<Kneissl et al., "Combined Integrity of GPS and Galileo", "Inside GNSS", Jan./Feb. 2010, pp. 52-63.
Lee et al., "Feasibility Analysis of RAIM to Provide LPV-200 Approaches with Future GPS", "ION GNSS 20th International Technical Meeting of the Satellite Division", Sep. 2007, pp. 2898-2910.
Lee, "Investigation of Extending Receiver Autonomous integrity Monitoring (RAIM) to Combined Use of Galileo and Modernized GPS", "ION GNSS 17th International Technical Meeting of the Satellite Division, Sep. 21-24, 2004", Sep. 1, 2004, pp. 1691-1698, Published in: Long Beach, CA.
Lee et al., "Advanced RAIM Based on Inter-Constellation Bomparisons to Detect Consistent Faults for LPV-200", "23rd International Technical Meeting of the Satellite Division of the Institute of Navigation", Sep. 21-24, 2010, pp. 272-284, Published in: Portland, OR.
Lee, "New Advanced RAIM with Improved Availability for Detecting Constellation-wide Faults, Using Two Independent Constellations", "Journal of the Institute of Navigation", Mar. 1, 2013, pp. 71-83, vol. 60, No. 1, Publisher: Institute of Navigation.
Madonna et al., "Analysis of Performances of NIORAIM Algorithms Implementation in a GNSS Monitoring System: Verification of Fault Detection Sensitivity in Presence of Bias", "IAIN Conference", Oct. 2009, pp. 1-11.

(56) References Cited

OTHER PUBLICATIONS

Orejas et al., "Multiconstellation GNSS/INS to Support LPV200 Approaches and Autolanding", "25th International Technical Meeting of the Satellite Division of the Institute of Navigation", Sep. 17-21, 2012, pp. 790-809, Published in: Nashville, TN.

Rippl, "Real Time Advanced Receiver Autonomous Integrity Monitoring in DLR's Multi-Antenna GNSS Receiver", "International Technical Meeting (ITM) of the Institute of Navigation", Jan. 1, 2012, pp. 1767-1776, Published in: Newport Beach, CA.

Vanderwerf, "FDE Using Multiple Integrated GPS/Inertial Kalman Filters in the Presence of Temporally and Spatially Correlated IONOSPH", "Proceedings of the Intstitute of Navigation (ION) GPS", Sep. 11-14, 2001, pp. 2676-2685.

Viola et al., "Design and Implementation of a Single-Frequency L1 Multiconstellation GPS/EGNOS/GLONASS SDR Receiver with NIORAIM FDE Integrity", 2012, pp. 1-10, Publisher: ION 2012 congress.

Young et al., "Advanced Fault Detection and Exclusion with Future GNSS Constellations", "Proceedings fo the 25th International Technical Meeting of the Satellite Division of the Institute of Navigation (ION GNSS 2012)", Sep. 21, 2012, pp. 2758-2763.

United States Patent and Trademark Office, "Advisory Action", From U.S. Appl. No. 14/092,454, dated Apr. 18, 2017, pp. 1-3, Published in: US.

United States Patent and Trademark Office, "Final Office Action", From U.S. Appl. No. 14/092,454, dated Feb. 8, 2017, pp. 1-15, Published in: US.

\* cited by examiner

SELECTED ASPECTS OF ADVANCED RECEIVER AUTONOMOUS INTEGRITY MONITORING APPLICATION TO KALMAN FILTER BASED NAVIGATION FILTER

CROSS-REFERENCE TO RELATED APPLICATION

This application is a divisional of U.S. application Ser. No. 13/850,341, filed on Mar. 26, 2013, which is incorporated herein by reference in its entirety.

STATEMENT REGARDING EUROPEAN SPACE AGENCY SPONSORED RESEARCH OR DEVELOPMENT

This invention is subject to European Space Agency (ESA) GCC contract terms. The ESA and others have certain rights in the invention and reporting requirements should be followed accordingly. The ESA has a license to any resulting patent, and others may have a right to a license based on favorable or commercial terms, depending on intended end use.

BACKGROUND

A global navigation satellite system (GNSS) is a system of space-based satellites that provide autonomous geo-spatial positioning with global coverage. Generally, a GNSS allows receivers to determine their location using time signals transmitted along a line-of-sight from the satellites. The Global Positioning System (GPS) is a GNSS that is maintained by the United States government and can be used by anyone with a GPS receiver. Similarly, GLONASS is a navigation satellite system maintained by Russia. The Galileo system is another GNSS that is currently being built by the European Union (EU) and European Space Agency (ESA). COMPASS is a navigation satellite system being developed by China.

A GNSS provides location information anywhere on or near the Earth where there is an unobstructed line of sight to four or more GNSS satellites. A processor coupled to the GNSS receiver uses at least four of the distances from the receiver to the satellites, known as pseudoranges, to accurately approximate the position of the receiver. The accuracy of the approximate position, or position solution, varies as changing atmospheric conditions affect signal-to-noise ratios and signal transit times. The accuracy also varies as the orbiting satellites occasionally experience protracted failures during which they continue to operate while providing erroneous or extra-noisy signals. These and other factors appear as random noise in the transmitted signals, random errors in the computed pseudoranges, and ultimately as a random error in the position solution itself.

Aircraft navigation systems based on the GNSS typically include a subsystem for integrity monitoring. Integrity is a measure of the trust that can be placed in the correctness of the information supplied by the navigation system. Integrity includes the ability of a system to provide timely (within limits specified by the time-to-alert) and valid warnings to the user when the system must not be used for the intended operation (or phase of flight). The subsystem, known as a receiver autonomous integrity monitoring (RAIM), determines the horizontal protection level (HPL). The HPL is the radius of a circle in the horizontal plane which describes the region that is assured to contain the indicated horizontal position. The HPL is a horizontal region for which the missed alert and false alert requirements are met. The HPL is a function of the satellite and user geometry and the expected error characteristics and thus is not affected by actual measurements. Depending on the phase of flight, the vertical protection level may also need to be computed. For the integrity to be considered available for a particular phase of flight, the protection level shall be less than the alert limit specified for that phase of flight. If the protection level exceeds the allowed alert limit, this means the navigation system is not able to provide the required integrity and must not be used further.

Currently, integrity monitoring techniques are an important component of current GNSS based navigation systems designed to support non-precision phases of flight, for example, en-route or terminal phases, where only the requirements for the horizontal protection limits need to be met. With the expected modernization of GPS and GLONASS, as well as development of new constellations such as Galileo and COMPASS, there is interest in whether a navigation system taking advantage of the increased number of visible satellites, transmitting in more than one frequency band, will be able to support more demanding phases of flight, e.g., precision approaches. For these phases of flight, integrity of horizontal and vertical position components of the navigation information need to be monitored simultaneously.

Preliminary assessment of integrity for more demanding phases is a focal point of many recent studies. It has been shown that currently used integrity monitoring techniques do not provide sufficient performance for future intended applications. Therefore, in the GNSS Evolutionary Architecture Study (GEAS)—Phase II, February 2010 (hereafter "GEAS-Phase II"), an integrity monitoring technique called advanced RAIM (ARAIM) was proposed for "snap-shot" solution and vertical guidance. ARAIM is expected to be an important component of future navigation systems based on multi-constellation/multi-frequency GNSS receivers.

SUMMARY

A method of advanced receiver autonomous integrity monitoring of a navigation system is discussed and two modifications facilitating its implementation in a hybrid navigation system are disclosed. In the first approach, relations describing the effect of unmodeled biases in pseudo-measurement on the Kalman filter state estimate are analytically derived and their incorporation into the integrity monitoring algorithm is described. The method comprises receiving a plurality of signals transmitted from space-based satellites, determining a position full-solution and sub-solutions, specifying a pseudorange bias, computing a transformation matrix for the full-solution and all sub-solutions using a Kalman filter, computing a bias effect on an error of filtered state vectors of all sub-solutions, and adding the effect to computed vertical and horizontal protection levels. In the second approach, a modification for computationally effective calculation of the protection levels of hybrid navigation systems based on both integrity and non-integrity assured pseudorange error descriptions is disclosed.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the drawings, in which.

DETAILED DESCRIPTION

In the following detailed description, reference is made to the accompanying drawings that form a part hereof, and in which is shown by way of illustration specific exemplary embodiments. It is to be understood, however, that other embodiments may be utilized and that logical, mechanical, and electrical changes may be made.

A method for integrity monitoring of a navigation system is described. In particular, two modifications of the advanced receiver autonomous integrity monitoring (ARAIM) method that are applicable to a hybrid navigation system based on a Kalman filter are disclosed. First, relations describing the effect of unmodeled biases in the pseudo-measurement on the state estimate are analytically derived under the Kalman filter framework and their incorporation into the ARAIM algorithm for the hybrid navigation system are described. Second, a computationally effective concept of utilization of the integrity assured and non-integrity assured measurement error descriptions in ARAIM for the hybrid navigation system is described.

The present method provides for handling of pseudorange biases that occur in multi-constellation, multi-frequency global navigation satellite system (GNSS) solutions. The present scheme is based on navigation algorithm processing of GNSS measurements, and is implemented in a navigation filter such as a Kalman filter to provide a filtered ARAIM.

The following abbreviations are used herein and are defined as follows:
ARAIM—Advanced Receiver Autonomous Integrity Monitoring;
GEAS—GNSS Evolutionary Architecture Study;
GNSS—Global Navigation Satellite System;
GPS—Global Positioning System;
HPL—Horizontal Protection Level;
IMU—Inertial Measurement Unit;
INS—Inertial Navigation System;
KF—Kalman Filter;
PL—Protection Level;
RAIM—Receiver Autonomous Integrity Monitoring;
SISA—Signal In Space Accuracy;
SISE—Signal In Space Error;
UERE-A—User Equivalent Range Error budget for Accuracy;
UERE-I—User Equivalent Range Error budget for Integrity;
URE—User Range Error;
URA—User Range Accuracy; and
VPL—Vertical Protection Level.

As proposed in GEAS-Phase II, ARAIM is based on the solution separation RAIM developed previously. The solution separation is an integrity monitoring method where a set of test statistics are formed by the difference between the full-solution and each sub-solution computed position and a set of decision thresholds are determined based on the statistics of the separation between the full-solution and sub-solution positions. The full-solution provides position estimates computed on the basis of all available satellite measurements (pseudoranges). The set of sub-solutions provide the estimate on the basis of subset of satellite measurements defined according to specified fault states. For example, under the assumption that only one satellite can be in fault at any given time and N satellite measurements are available, then there will be N statistics to be tested and N sub-solutions where each sub-solution position is computed by removing one different measurement. The solution separation is thus an integrity method working in position domain and can be used with pure GNSS navigation systems or with hybrid navigation systems.

The pure GNSS navigation system provides position and velocity estimates computed usually by a weighted least-squares method from GNSS measurements only. Such a navigation algorithm is often called a "snap-shot" navigation algorithm. The hybrid (or integrated) navigation system combines GNSS signals, inertial measurements, and optionally measurements from other sensors. Besides position and velocity estimates, the hybrid navigation system also provides attitude estimates.

Figure 1:
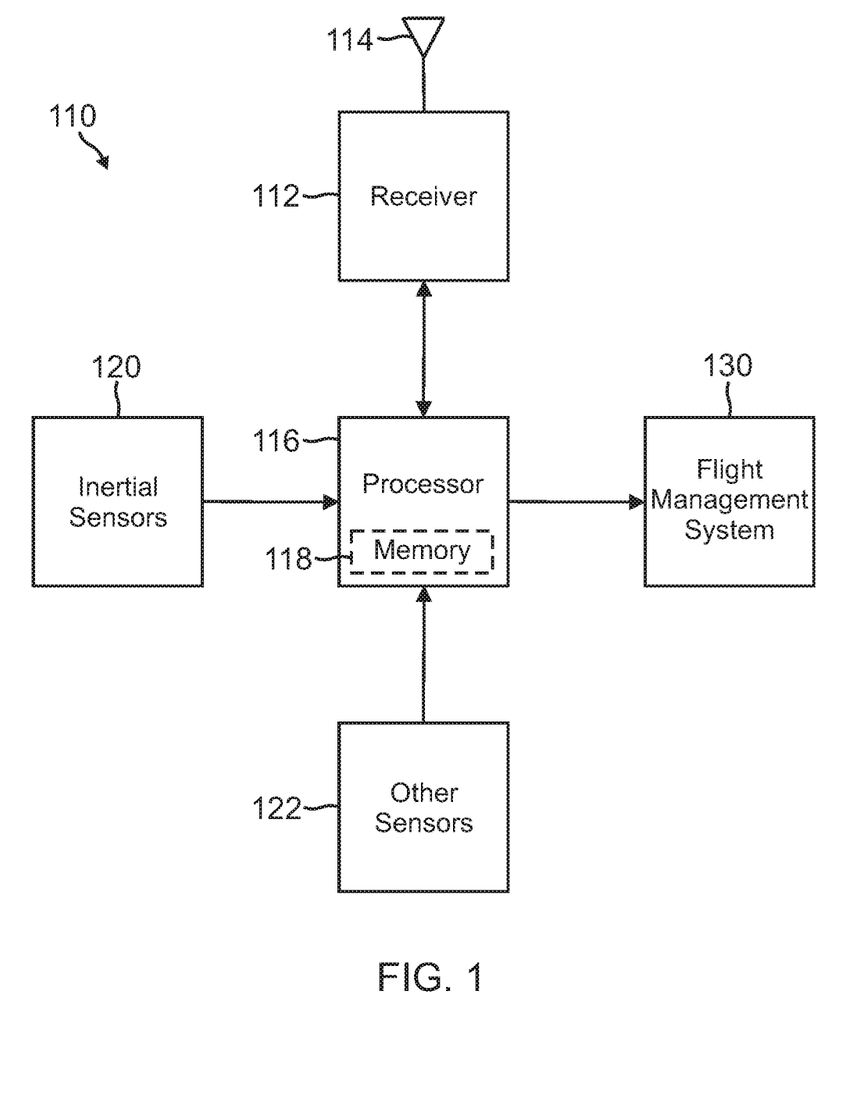
FIG. 1 illustrates a navigation system according to one embodiment.

FIG. 1 illustrates a hybrid navigation system 110 according to one embodiment, which can implement the present approach. The navigation system 110, which can be mounted to an aircraft, generally includes a satellite receiver 112 with at least one antenna 114, at least one processor 116, and at least one memory unit 118. The navigation system 110 also includes one or more inertial sensors 120 that provide inertial data to processor 116. In one embodiment, inertial sensors 120 are implemented in an inertial measurement unit (IMU), which includes three accelerometers for measuring acceleration in three dimensions and three gyroscopes for measuring angular velocity relative to a reference plane. The navigation system 110 can also include one or more other sensors 122, which provide additional sensor data to processor 116. Examples of other sensors include an altitude sensor, an electro-optical sensor, or a magnetometer, among others.

During operation, receiver 112 receives satellite signals such as GNSS signals, extracts the position and time data from the signals, and provides pseudorange measurements to processor 116. From the pseudorange measurements and the inertial measurements, processor 116 derives a position, velocity, and attitude solution, such as by using a Kalman filter. The processor 116 can also use the pseudorange measurements to detect satellite transmitter failures and to determine a worst-case error, or protection limit, both of which are outputs with the position solution, such as to a flight management system 130. The flight management system 130 compares the protection limit to an alarm limit corresponding to a particular aircraft flight phase.

A computer or processor used in the present system and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

The present methods can be implemented by computer executable instructions, such as program modules or components, which are executed by at least one processor.

Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

ARAIM has been designed for snap-shot navigation algorithms. Contrary to the original solution separation, ARAIM is intended to support vertical guidance for precision approaches (e.g., LPV-200) and other phases of flight which are tied with more stringent requirements than the above mentioned non-precision approaches. In order to meet these more stringent requirements several modifications were done to the original solution separation method. The most important ones are listed below:

- probabilities of false detection and missed detection can be freely allocated among the sub-solutions reducing the computed protection levels (PLs) and thereby increasing service availability;
- more realistic computation of both vertical and horizontal protection levels, which is partly on the basis of integrity-assured and partly on non-integrity-assured standard deviations of pseudorange measurement error; and
- more realistic modeling of pseudorange measurements errors by explicit consideration of (unmodeled) biases and their impact on computed PLs.

To implement the ARAIM concept on a hybrid navigation system, the algorithm of the "snap-shot" ARAIM has to be somehow modified respecting the characteristic properties of the hybrid navigation system. The ideas and relations for allocation of the probabilities can be directly adopted for hybrid navigation systems. However, the relations evaluating the effect of unmodeled biases need to be re-developed as the Kalman filter is, contrary to a least-squares method, a dynamic system. Also, to reduce computational complexity of the hybrid navigation system based ARAIM (denoted hereafter "filtered ARAIM"), an approach for effective computation of protection levels with respect to two different pseudorange measurement error models is proposed.

In order to implement the present scheme to provide a filtered ARAIM, both topics, effect of the unmodeled biases in pseudoranges on position error; and integrity and non-integrity assured description of pseudorange error in protection levels (PL) computation, are addressed in detail hereafter.

Effect of Biases in Pseudoranges on Filtered Position Error

The ARAIM technique is based on a navigation algorithm that processes GNSS measurements through a weighted least squares method (snap-shot navigation solution). In GEAS-Phase II, it was agreed to consider the presence of (unmodeled) biases in range measurements under non-faulted conditions, and the relations for the snap-shot navigation solution were proposed. The underlying idea and basic relations of the effect of the unmodeled biases on the position solution in the least-squares method are explained below, and then the particular relations used in ARAIM are summarized.

The snap-shot algorithm for position computation based on GNSS measurements (pseudoranges) can be written in the following form:

$$\Delta x = S \Delta \rho$$

where:

$\Delta x$ is position correction to initial position estimate $\hat{x}_{init}$ in, for example, a local geographic north-east-down (NED) coordinate system;

$\Delta \rho$ is pseudorange error vector (measured pseudoranges minus estimated ones on the basis of $\hat{x}_{init}$); and S is the least squares solution matrix equal to:

$$S = (H^T W H)^{-1} H^T W$$

with H being the measurement matrix and W the weighting matrix. The covariance matrix for the position correction (and position estimate) is:

$$P = (H^T W H)^{-1}$$

If the unmodeled bias is considered in pseudorange measurements, that is:

$$\Delta \rho_{biased} = \Delta \rho + b$$

then the bias affects the computed position as:

$$\Delta x_{biased} = S \Delta \rho_{biased} = S \Delta \rho + S b = S \Delta \rho + \varepsilon_{bias}.$$

The worst case sign combination of the bias effect on position can be computed as $|S| \cdot |b|$.

As mentioned above, in ARAIM the position estimate, least-squares solution matrix, and the covariance matrix are computed for the full-solution and all sub-solutions. Let the covariance matrix and solution matrix for the full-solution be denoted as $P_0$ and $S_0$, respectively, and for each sub-solution as $P_n$ and $S_n$, with n=1, 2, . . . , N, respectively. Then, based on the covariance or solution matrices, the set of "$D_n$" and "$A_n$" terms is computed for all n and for vertical and horizontal channels (denoted $D_{n,vert}$, $A_{n,vert}$ and $D_{n,hor}$, $A_{n,hor}$). The "$D_n$" terms are the decision thresholds computed on the basis of the probability of false alarm and the separation covariance matrix defined as $dP_n = P_n - P_0$ for n-th sub-solution. The "$A_n$" terms represent the error bounds which depend on the probability of missed detection and covariance matrix $P_n$. If the unmodeled biases in pseudorange measurements are considered, their worst case sign combination effect for vertical channel can be expressed as:

$$\varepsilon_{worst,n}^{vertical} = D_{n,bias,vertical} + A_{n,bias,vertical}$$

where $$D_{n,bias,vertical} = B_{nom} \sum_{n=1}^{N} |S_0(3, n) - S_n(3, n)|$$

$$A_{n,bias,vertical} = B_{max} \sum_{n=1}^{N} |S_n(3, n)|$$

$S_i(3,n)$ is the element of matrix $S_i$ at row 3 and column n, $B_{nom}$ is the nominal bias, and $B_{max}$ is the maximum bias. The vertical protection level (VPL) is subsequently computed as the maximum of $(A_{n,vert}+D_{n,vert}+\varepsilon_{worst,n}^{vertical})$ over n. Although not considered in GEAS-Phase II, the worst case sign combination effect can be analogously defined for horizontal channel as $$\varepsilon_{worst,n}^{horizontal} = D_{n,bias,horizontal} + A_{n,bias,horizontal}$$

where $$D_{n,bias,horizontal} = B_{nom}\sum_{n=1}^{N} |S_0(1:2, n) - S_n(1:2, n)|$$

$$A_{n,bias,horizontal} = B_{max}\sum_{n=1}^{N} |S_n(1:2, n)|$$

and $S_i(1:2, n)$ stands for the elements of matrix $S_i$ at row 1 and 2 and column n. The HPL might be subsequently computed as the maximum of $(A_{n,hor}+D_{n,hor}+f_{\varepsilon,n,hor})$ over n, where the function related to the bias effect might be in the following form:

$$f_{\varepsilon,n,hor} = \sqrt{(A_{n,bias,horizontal}(1))^2 + (A_{n,bias,horizontal}(2))^2} + \sqrt{(D_{n,bias,horizontal}(1))^2 + (D_{n,bias,horizontal}(2))^2}$$

Notation $A_{n,bias,horizontal}(i)$ denotes i-th element of the vector $A_{n,bias,horizontal}$.

The previous unmodeled pseudorange bias analysis is relatively straightforward. Examination of the unmodeled pseudorange bias effect in a hybrid navigation system (processing other measurements in addition to the GNSS measurements) is more involved as the hybrid navigation system is usually realized using a state estimator (the Kalman filter in this case but different state estimator can be generally used as well). Contrary to the least-squares which represent a static method, the filter is in fact a dynamic system. The bias effect analysis in the Kalman filter context is presented next.

The Kalman filter is an estimation algorithm based on the mathematical model of the underlying system in state-space form. In hybrid navigation systems, the state is composed of components related to the position, velocity, attitude, and biases of inertial and possibly other sensors. The measurement vector can include satellite measurements, pseudoranges, and possibly other measurements if available.

The mathematical models used in hybrid navigation systems, derived on the basis of kinematic and other physical or mechanical laws, are usually continuous in time and non-linear. For the purposes of the Kalman filter based hybrid navigation system design, the models are often linearized and discretized.

Examination of the unmodeled pseudorange bias effect on the position in a filtered solution is based on analysis of the Kalman filter (as the optimal estimator for linear discrete-time systems). Let the discrete-time linear stochastic dynamic system be considered and described by a state-space model:

$$x_{k+1}=F_k x_k + w_k$$

$$z_k = H_k x_k + v_k$$

where:
- $x_k$, $z_k$ are the immeasurable state and measurement;
- $F_k$, $H_k$ are known matrices; and
- $w_k$, $v_k$ are the zero-mean noises with known covariance matrices $Q_k$, $R_k$.

The Kalman filter estimates in the presence of the unmodeled bias in measurements, that is, $$z'_k = z_k + b_k$$

are related to the optimal estimates via the following relation:

$$\hat{x}_{k|k}^{wB} = \hat{x}_{k|k}^{OPT} + \sum_{i=0}^{k}\left[\prod_{j=1+i}^{k}(F_{l-1}-K_l H_l F_{l-1})\right]K_i b_i$$

where $l=-j+k+i+1$ and
$\hat{x}_{k|k}^{OPT}$ is the optimum filtering estimate (no unmodeled bias in measurement is considered)

$$\hat{x}_{k|k}^{OPT}=\hat{x}_{k|k-1}^{OPT}+K_k(z_k-H_k\hat{x}_{k|k-1}^{OPT})$$

$K_k$ is the Kalman gain $$K_k=P_{k|k-1}H_k^T(H_k P_{k|k-1}H_k^T+R_k)^{-1}$$

The relation describing the effect of the unmodeled bias on the state estimate can be derived using mathematical induction. For illustration, derivation for time instants k=0, 1 is given.

$k = 0$ $$\hat{x}_{0|0}^{wB} = \hat{x}_{0|-1} + K_0(z'_0 - H_0\hat{x}_{0|-1}) = \hat{x}_{0|-1} + K_0(z_0 + b_0 - H_0\hat{x}_{0|-1})$$
$$= \hat{x}_{0|-1} + K_0(z_0 + H_0\hat{x}_{0|-1}) + K_0 b_0$$
$$= \hat{x}_{0|0}^{OPT} + K_0 b_0$$

where $\hat{x}_{0|-1}$ is the filter initial condition, $k = 1$ $$\hat{x}_{1|1}^{wB} = \hat{x}_{1|0}^{wB} + K_1(z'_1 - H_1\hat{x}_{1|0}^{wB}) = \hat{x}_{1|0}^{wB} + K_1(z_1 + b_1 - H_1\hat{x}_{1|0}^{wB})$$
$$= F_0\hat{x}_{0|0}^{OPT} + F_0 K_0 b_0 + K_1(z_1 - H_1 F_0 \hat{x}_{0|0}^{OPT} - H_1 F_0 K_0 b_0) + K_1 b_1$$
$$= \hat{x}_{1|1}^{OPT} + (F_0 - K_1 H_1 F_0)K_0 b_0 + K_1 b_1$$

where equalities $\hat{x}_{1|0}^{wB}=F_0\hat{x}_{0|0}^{wB}$, $\hat{x}_{1|1}^{OPT}=F_0\hat{x}_{0|0}^{OPT}+K_1(z_1-H_1 F_0\hat{x}_{0|0}^{OPT})$ were used.

The matrix that transforms the unmodeled range biases into state-space variables can be denoted as:

$$G_k = \sum_{i=0}^{k}\left[\prod_{j=1+i}^{k}(F_{l-1}-K_l H_l F_{l-1})\right]K_i$$

To prevent the necessity to store the matrices $F_m$, $H_m$, $K_m$, m=0, 1, ..., k, the transformation matrix can be computed using a recursive form:

$$G_{k+1}=(F_k-K_{k+1}H_{k+1}F_k)G_k+K_{k+1}$$

where $G_0=K_0$.

Assuming a small change of the state transition matrix $F_k$ over one period the form can be further simplified as follows:

$$G_{k+1} = (F_{k+1} - K_{k+1}H_{k+1}F_{k+1})G_k + K_{k+1}$$

Moreover, under assumption that the system is time invariant (which is valid for certain phases of flight and short time periods) the relation for bias effect inclusion can be simplified as:

$$\hat{x}_{k|k}^{wB} = \hat{x}_{k|k}^{OPT} + \left[\sum_{i=0}^{k}(F-KHF)^i\right]Kb$$

and further rewritten (under assumption the matrix (F−KHF) is stable) as:

$$\hat{x}_{k|k}^{wB} = \hat{x}_{k|k}^{OPT} + (I-F+KHF)^{-1}Kb = \hat{x}_{k|k}^{OPT} + Gb$$

The assumption of stable matrix (F−KHF) is not restrictive as the matrix is a transition (or dynamic) matrix of the filtered estimate error. Thus, it should be stable to have a "non-divergent" navigation filter. The worst case sign combination of the bias effect in filtered version is $|G_k|\cdot|b|$ or $|G|\cdot|b|$.

Derived transformation matrices $G_k$ or $G$ for the filtered ARAIM (or its part transforming the unmodeled bias in measurement into the error in position) can be treated as the matrix S in the snap-shot ARAIM. This means that matrices $G_k$ or $G$ are computed for the full-solution and each sub-solution. The worst case sign combination is then used in computation of protection levels as proposed in GEAS—Phase II.

According to simulations, the effects of unmodeled biases in pseudoranges on the position error for pure GNSS and hybrid navigation systems, i.e., those computed on the basis of S matrices and G matrices, respectively, are almost equal except for the transient period after a new satellite measurement is incorporated in the solution or a satellite measurement is dropped from the solution. If altitude measurements are available and integrated in the navigation filter with GNSS and IMU measurements, the effect of the unmodeled biases is reduced especially for the vertical channel, which subsequently results in lower vertical PL.

It should be noted that the previous discussion is focused on the effect of unmodeled bias in the measurement on the error in position. However, the same transformation matrix, G or $G_k$, can also be used for evaluation of the unmodeled measurement bias in the measurement on any other component of the state vector (on e.g., velocity, attitude).

Figure 2:
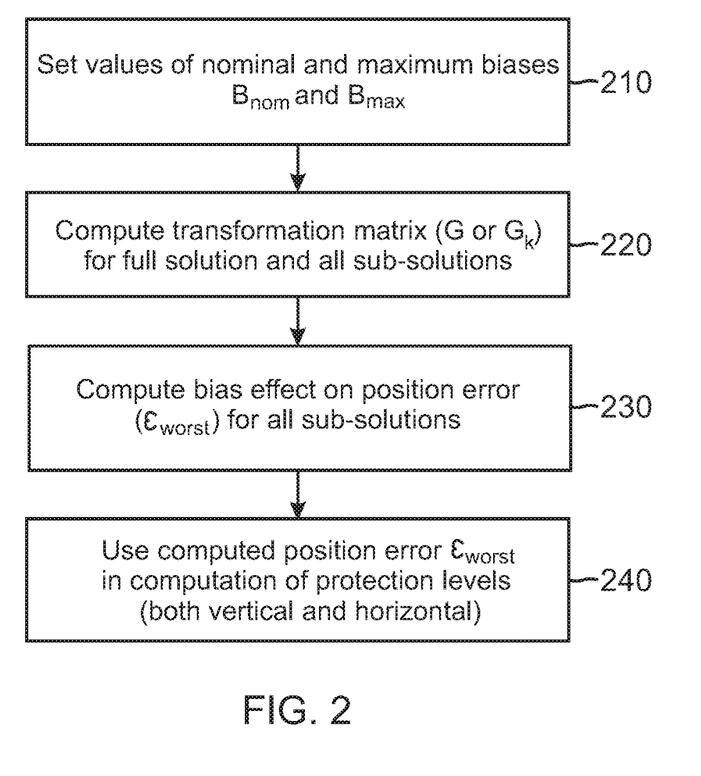
FIG. 2 is a flow diagram of a method for handling the effects of unmodeled biases in pseudoranges on position error of a filtered navigation solution.

FIG. 2 is a flow diagram for an exemplary process of handling the effect of unmodeled biases in pseudoranges on filtered position error. Initially, a value of the nominal and maximum biases ($B_{nom}$ and $B_{max}$) are set (block 210). A transformation matrix (G or $G_k$) is then computed for a full-solution and all sub-solutions using a Kalman filter (block 220), where k in $G_k$ is a time index. A bias effect on position error ($\varepsilon_{worst}$) is then computed for all sub-solutions (block 230). It is assumed the sign of the biases is such that it produces the worst position error. The position error ($\varepsilon_{worst}$) is then used in computation of the protection levels for both vertical and horizontal positions (block 240).

Integrity and Non-Integrity Assured Description of Pseudorange Error

The snap-shot ARAIM technique takes an advantage of using different pseudorange error standard deviations for computation of the decision threshold corresponding to the probability of false alarm and the error bound corresponding to the probability of missed detection, usually denoted as "An" and "Dn" terms. Variable Dn affects the continuity of the navigation system only and thus it should be computed on the basis of a non-integrity assured pseudorange error standard deviation. On the other hand, variable An is directly related to the integrity and thus its computation is based on a more conservative integrity assured pseudorange error definition.

Hereafter, the non-integrity assured pseudorange error standard deviation is called "User equivalent range error budget for accuracy (UERE-A)" and the integrity assured one is called "User equivalent range error budget for integrity (UERE-I)". The budget UERE-A is based on the models for user range error (URE), multipath error, troposphere error, and other errors. The budget UERE-I is based on a generally different set of models for user range accuracy (URA), multipath error, troposphere error, and other errors. It should be noted that the abbreviations URA and URE are for GPS. For the Galileo constellation, the terms "SISA" (signal-in-space-accuracy) and "SISE" (signal-in-space-error) are used instead.

Considering different error statistics in the snap-shot ARAIM naturally results in two sets of multiple weighted least-squares solutions with different weighting matrices, such an approach is still computationally feasible. The analogous approach for the filtered ARAIM leads to running twice as many filters (one set with UERE-I the other with UERE-A), which may require significant computational throughput. To reduce the computational demands, an alternative approach is to compute terms Dn also on the basis of UERE-I. However, this leads to a conservative estimate of the protection levels as the pseudorange error description based UERE-I is larger than the one based on UERE-A.

The computational effective (avoiding run of two sets of filters) yet not so conservative approach is described hereafter. This approach is based on the assumption that the ratios of the position covariance matrices of the respective UERE-I or UERE-A based filtered full-solutions and sub-solutions will be almost identical. Therefore, it should be sufficient to have a bank of filters (one full-solution and N sub-solutions) based on UERE-I and one full-solution based on UERE-A. Then, the ratio of the UERE-I and UERE-A based full-solution covariance matrices can be used to compute the remaining UERE-A based sub-solution covariance matrices with relatively low computational demands. A detailed description of this approach follows.

Let two sets of filters be considered:

$KF_{0,UERE-I}$ and $KF_{n,UERE-I}$ with n=1, 2, ..., N, $KF_{0,UERE-A}$ and $KF_{n,UERE-A}$ with n=1, 2, ..., N, where the notation $KF_{0,UERE-I}$ means the full-solution Kalman filter (KF) based on UERE-I error definition and $KF_{n,UERE-I}$ is n-th sub-solution. Kalman filters with subscript UERE-A are defined analogously.

The horizontal position covariance matrix and vertical position variance computed by the filter $KF_{j,UERE-I}$ are defined as:

$$P_{horPos,j,UERE-I}, P_{verPos,j,UERE-I}, j=0,1,2,\ldots,N$$

Under the assumption of a sufficient number of available satellite measurements (e.g., a dual constellation scenario), the position estimates covariance matrices ratios of two respective Kalman filters, $KF_{j,\,UERE-I}$ and $KF_{j,UERE-A}$, are almost constant, $\forall j$. It should be noted that the term "ratio"

in the case of covariance matrices is figurative only. The ratios for vertical position variances can be computed as:

$$\kappa_{verPos,j} = P_{verPos,j,UERE-A}/P_{verPos,j,UERE-I},$$
$$j=0,1,2,\ldots,N$$

The ratios for the horizontal position covariance matrices can be computed, for example, as:

$$\kappa_{horPos,j} = \max(eig(P_{horPos,j,UERE-A}))/\max(eig(P_{horPos,j,UERE-I})), j=0,1,2,\ldots,N$$

where the function max(eig(P)) stands for the maximum of the covariance matrix P eigenvalues. Alternatively, instead of eigenvalues, other matrix functions can be used as well. Then, having for example $\kappa_{verPos,0}$ computed on the basis of UERE-A and UERE-I based full filters, that is:

$$\kappa_{verPos,0} = P_{verPos,0,UERE-A}/P_{verPos,0,UERE-I},$$

and vertical variances for UERE-I based sub-solutions, that is:

$$P_{verPos,j,UERE-I}, j=0,1,2,\ldots,N,$$

the variances of UERE-A based sub-solutions can be approximately computed as:

$$P_{verPos,n,UERE-A} \approx \kappa_{verPos,0} P_{verPos,n,UERE-I},$$
$$n=1,2,\ldots,N$$

without the necessity to run another bank of UERE-A based subfilters (sub-solutions). The computations for horizontal channels are analogous.

The present approach has been thoroughly validated using Monte-Carlo simulations for various scenarios. In considered scenarios, a relative discrepancy between the true variance $P_{verPos,n,UERE-A}$ and its approximation using the proposed relation $\kappa_{verPos,0} P_{verPos,n,UERE-I}$ was of order of few percents.

Although the ratios for respective UERE-I and UERE-A based Kalman filters are very similar, there is still a rather negligible difference. To compensate for this difference, a multiplying constant can be used in UERE-A-based covariance matrices related computations (based on, e.g., Monte-Carlo simulation results).

Figure 3:
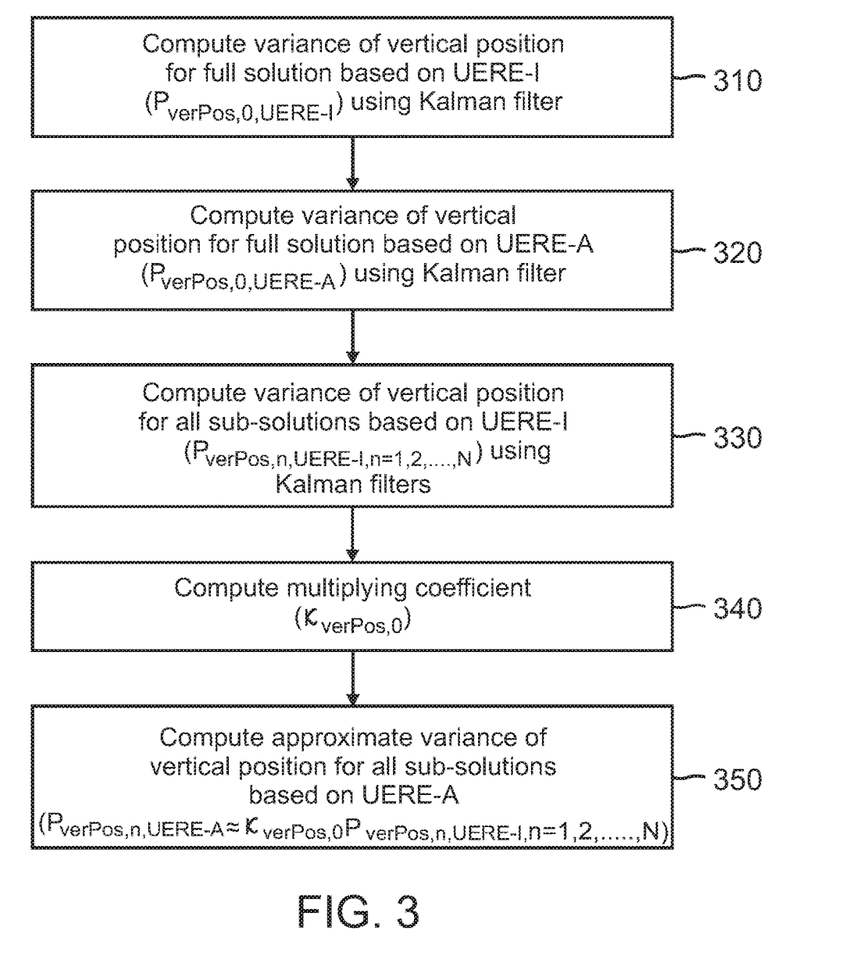
FIG. 3 is a flow diagram of a method for integrity and non-integrity assured description of a pseudorange error in a vertical channel.

FIG. 3 is a flow diagram showing a method for integrity and non-integrity assured description of a pseudorange error for a vertical channel. Initially, a variance of the vertical position is computed for a full-solution based on UERE-I ($P_{verPos,0,UERE-I}$) using a Kalman filter (block 310). A variance of the vertical position is then computed for the full-solution based on UERE-A ($P_{verPos,0,UERE-A}$) using the Kalman filter (block 320). A variance of the vertical position for all sub-solutions (N) is then computed based on UERE-I ($P_{verPos,n,UERE-I}$, n=1, 2, ..., N) using the Kalman filter (block 330). A multiplying coefficient ($\kappa_{verPos,0}$) is then computed (block 340). An approximate variance of the vertical position for all sub-solutions is then computed based on UERE-A (block 350) as:

$$P_{verPos,n,UERE-A} \approx \kappa_{verPos,0} P_{verPos,n,UERE-I}, \text{ where } n=1, 2,\ldots,N.$$

Figure 4:
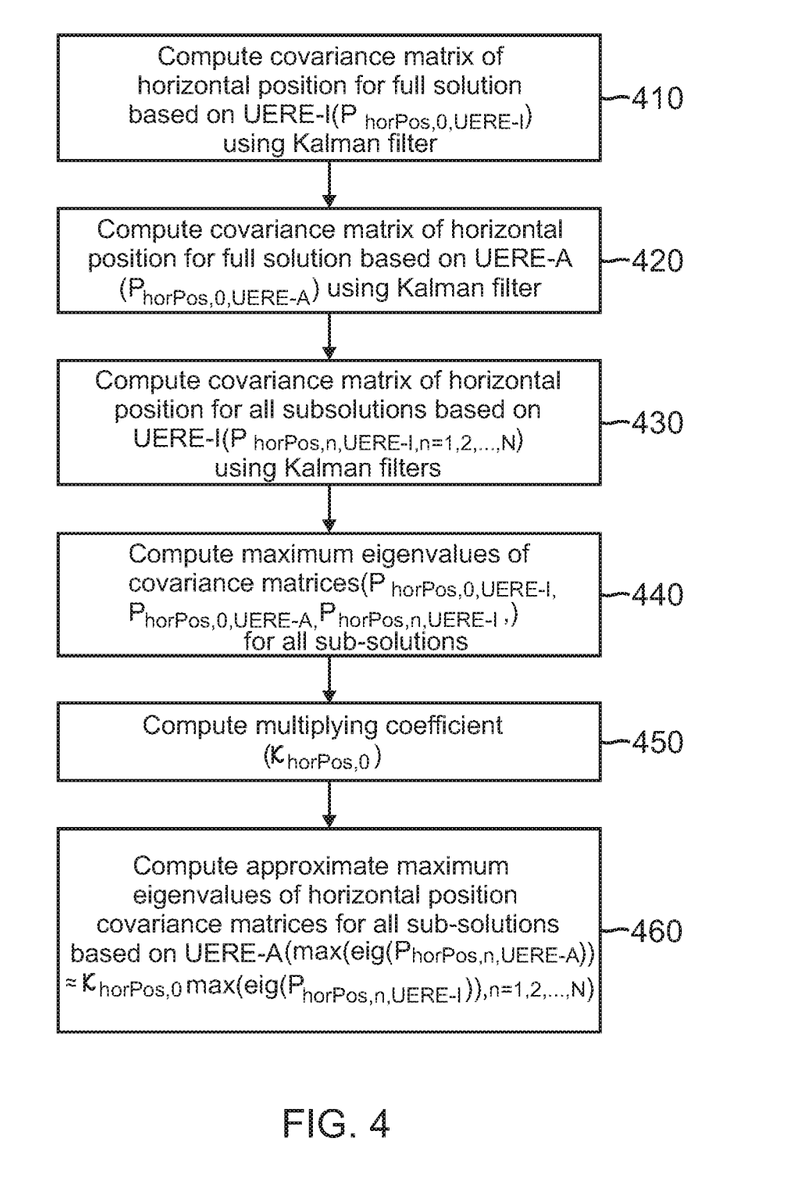
FIG. 4 is a flow diagram of a method for integrity and non-integrity assured description of pseudorange error in a horizontal channel.

FIG. 4 is a flow diagram showing a method for integrity and non-integrity assured description of pseudorange error for a horizontal channel. Initially, a covariance matrix of horizontal position is computed for a full-solution based on UERE-I ($P_{horPos,0,UERE-I}$) using a Kalman filter (block 410). A covariance matrix of the horizontal position is then computed for the full-solution based on UERE-A ($P_{horPos,0,UERE-A}$) using the Kalman filter (block 420). A covariance matrix of the horizontal position for all sub-solutions (N) is then computed based on UERE-I ($P_{horPos,n,UERE-I}$, with n=1, 2, ..., N) using the Kalman filter (block 430). The maximum eigenvalues of the covariance matrices ($P_{horPos,0,UERE-I}$, $P_{horPos,0,UERE-A}$, $P_{horPos,n,UERE-I}$) are then computed for all sub-solutions (block 440). A multiplying coefficient ($\kappa_{horPos,0}$) is then computed (block 450). The approximate maximum eigenvalues of the horizontal position covariance matrices are then computed for all sub-solutions based on UERE-A (block 460) as:

$$\max(eig(P_{horPos,n,UERE-A})) \approx \kappa_{horPos,0} \max(eig(P_{horPos,n,UERE-I})), \text{ where } n=1,2,\ldots,N.$$

It should be noted that the maximum eigenvalue function can be generally replaced by a different function.

While the foregoing discussion focuses on use of a Kalman filter, it should be understood that other types of filters can be used for state estimation in the present approach. Examples of such filters include an extended Kalman filter, an unscented Kalman filter, a particle filter, a Gaussian sum filter, or the like.

Example Embodiments

Example 1 includes a method of integrity monitoring for errors in a navigation system, the method comprising receiving a plurality of signals transmitted from a plurality of space-based satellites; determining a full position solution for the navigation system based on the plurality of signals; determining one or more position sub-solutions for the navigation system based on the plurality of signals; setting a value for a pseudorange bias; computing a transformation matrix for the full solution and all sub-solutions using a Kalman filter; computing a bias effect on an error of a filtered state vector component for all sub-solutions; and adding the bias effect on the error of the filtered state vector component to computed protection levels for both vertical and horizontal dimensions.

Example 2 includes the method of Example 1, wherein the state vector component comprises position, velocity, or attitude.

Example 3 includes the method of any of Examples 1-2, wherein the method is implemented as part of an advanced receiver autonomous integrity monitoring (ARAIM) algorithm.

Example 4 includes the method of any of Examples 1-3, wherein the space-based satellites are part of a global navigation satellite system (GNSS).

Example 5 includes the method of Example 4, wherein the GNSS is a multi-constellation, multi-frequency GNSS.

Example 6 includes a method of integrity monitoring for errors in a navigation system, the method comprising receiving a plurality of signals transmitted from a plurality of space-based satellites; determining a full position solution for the navigation system based on the plurality of signals; determining one or more position sub-solutions for the navigation system based on the plurality of signals; computing a variance of a vertical position for the full position solution with a state estimation filter based on an integrity assured error definition; computing a variance of a vertical position for the full position solution with the state estimation filter based on a non-integrity assured error definition; computing a variance of the vertical position for all position sub-solutions with one or more additional state estimation filters based on the integrity assured error definition; computing a multiplying coefficient; and computing an approximate variance of the vertical position for all position sub-solutions based on the non-integrity assured error definition and the multiplying coefficient.

Example 7 includes the method of Example 6, and further comprising computing a covariance matrix of the horizontal position for a full position solution with the state estimation filter based on the integrity assured error definition; computing a covariance matrix of the horizontal position for the full position solution with the state estimation filter based on the non-integrity assured error definition; computing a covariance matrix of the horizontal position for all position sub-solutions with the one or more additional state estimation filters based on the integrity assured error definition; computing maximum eigenvalues for the horizontal position covariance matrices; computing a multiplying coefficient; and computing approximate maximum eigenvalues for the horizontal position covariance matrices for all position sub-solutions based on the non-integrity assured error definition and the multiplying coefficient.

Example 8 includes the method of any of Examples 6-7, wherein the state estimation filter comprises a Kalman filter, an extended Kalman filter, an unscented Kalman filter, a particle filter, or a Gaussian sum filter.

Example 9 includes the method of any of Examples 6-8, wherein the method is implemented as part of an ARAIM algorithm.

Example 10 includes the method of any of Examples 6-9, wherein the space-based satellites are part of a GNSS.

Example 11 includes the method of Example 10, wherein the GNSS is a multi-constellation, multi-frequency GNSS.

Example 12 includes a navigation system, comprising one or more inertial sensors that generate inertial measurements; a receiver configured to receive a plurality of signals transmitted from a plurality of space-based satellites; and a processor operatively coupled to the receiver and the inertial sensors, the processor configured to perform a method of integrity monitoring implemented as part of an ARAIM algorithm.

Example 13 includes the navigation system of Example 12, wherein the integrity monitoring performed by the processor comprises determining a full position solution for the navigation system based on the plurality of signals; determining one or more position sub-solutions for the navigation system based on the plurality of signals; setting a value for a pseudorange bias; computing a transformation matrix for the full solution and all sub-solutions using a Kalman filter; computing a bias effect on an error of a filtered state vector component for all sub-solutions; and adding the bias effect on the error of the filtered state vector component to computed protection levels for both vertical and horizontal dimensions.

Example 14 includes the navigation system of Example 12, wherein the integrity monitoring performed by the processor comprises determining a full position solution for the navigation system based on the plurality of signals; determining one or more position sub-solutions for the navigation system based on the plurality of signals; computing a variance of a vertical position for the full position solution with a Kalman filter based on an integrity assured error definition; computing a variance of a vertical position for the full position solution with the Kalman filter based on a non-integrity assured error definition; computing a variance of the vertical position for all position sub-solutions with one or more additional Kalman filters based on the integrity assured error definition; computing a multiplying coefficient; and computing an approximate variance of the vertical position for all position sub-solutions based on the non-integrity assured error definitions and the multiplying coefficient.

Example 15 includes the navigation system of Example 14, wherein the integrity monitoring performed by the processor further comprises computing a covariance matrix of the horizontal position for a full position solution with the Kalman filter based on the integrity assured error definition; computing a covariance matrix of the horizontal position for the full position solution with the Kalman filter based on the non-integrity assured error definition; computing a covariance matrix of the horizontal position for all position sub-solutions with the one or more additional Kalman filters based on the integrity assured error definition; computing maximum eigenvalues for the horizontal position covariance matrices; computing a multiplying coefficient; and computing approximate maximum eigenvalues for the horizontal position covariance matrices for all position sub-solutions based on the non-integrity assured error definition and the multiplying coefficient.

Example 16 includes the system of any of Examples 12-15, wherein the receiver is configured to receive signals from a GNSS.

Example 17 includes the system of any of Examples 12-16, wherein the receiver is configured to receive signals from a multi-constellation, multi-frequency GNSS.

Example 18 includes the system of any of Examples 12-17, wherein the inertial sensors are implemented in an inertial measurement unit.

Example 19 includes the system of any of Examples 12-18, further comprising one or more additional sensors in operative communication with the processor.

Example 20 includes the system of any of Examples 12-19, wherein the system is onboard an aircraft.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of integrity monitoring for errors in a navigation system, the method comprising:
   receiving, in an onboard satellite receiver, a plurality of satellite signals transmitted from a plurality of space-based satellites;
   obtaining inertial measurements from one or more onboard inertial sensors;
   sending the satellite signals and the inertial measurements to an onboard processor operatively connected to the satellite receiver and the inertial sensors, wherein the integrity monitoring is performed by the processor and comprises:
   determining a full position solution for the navigation system based on the satellite signals and the inertial measurements;
   determining one or more position sub-solutions for the navigation system based on the satellite signals and the inertial measurements;
   setting values for unmodeled pseudorange biases;
   computing a transformation matrix of the unmodeled pseudorange biases for the full solution and all sub-solutions using a Kalman filter;
   computing a bias effect of the unmodeled pseudorange biases on an error of a filtered state vector component for all sub-solutions; and
   adding the bias effect of the unmodeled pseudorange biases on the error of the filtered state vector component to computed protection levels for both vertical and horizontal dimensions.

2. The method of claim 1, wherein the state vector component comprises position, velocity, or attitude.

3. The method of claim 1, wherein the method is implemented as part of a advanced receiver autonomous integrity monitoring (ARAIM).

4. The method of claim 1, wherein the space-based satellites are part of a global navigation satellite system (GNSS).

5. The method of claim 4, wherein the GNSS is a multi-constellation, multi-frequency GNSS.

6. A method of integrity monitoring for errors in a navigation system, the method comprising:
receiving, in an onboard satellite receiver, a satellite signals transmitted from a plurality of space-based satellites;
obtaining inertial measurements from one or more onboard inertial sensors;
sending the satellite signals and the inertial measurements to an onboard processor operatively connected to the satellite receiver and the inertial sensors, wherein the integrity monitoring is performed by the processor and comprises:
determining a full position solution for the navigation system based on the satellite signals and the inertial measurements;
determining one or more position sub-solutions for the navigation system based on the satellite signals and the inertial measurements;
computing a variance of a vertical position for the full position solution with a state estimation filter based on an integrity assured error definition;
computing a variance of a vertical position for the full position solution with the state estimation filter based on a non-integrity assured error definition;
computing a variance of the vertical position for all position sub-solutions with one or more additional state estimation filters based on the integrity assured error definition;
computing a multiplying coefficient; and
computing an approximate variance of the vertical position for all position sub-solutions based on the non-integrity assured error definition and the multiplying coefficient.

7. The method of claim 6, further comprising:
computing a covariance matrix of the horizontal position for a full position solution with the state estimation filter based on the integrity assured error definition;
computing a covariance matrix of the horizontal position for the full position solution with the state estimation filter based on the non-integrity assured error definition;
computing a covariance matrix of the horizontal position for all position sub-solutions with the one or more additional state estimation filters based on the integrity assured error definition;
computing maximum eigenvalues for the horizontal position covariance matrices;
computing a multiplying coefficient; and
computing approximate maximum eigenvalues for the horizontal position covariance matrices for all position sub-solutions based on the non-integrity assured error definition and the multiplying coefficient.

8. The method of claim 6, wherein the state estimation filter comprises a Kalman filter, an extended Kalman filter, an unscented Kalman filter, a particle filter, or a Gaussian sum filter.

9. The method of claim 7, wherein the method is implemented as part of a advanced receiver autonomous integrity monitoring (ARAIM).

10. The method of claim 6, wherein the space-based satellites are part of a global navigation satellite system (GNSS).

11. The method of claim 10, wherein the GNSS is a multi-constellation, multi-frequency GNSS.

12. The method of claim 1, wherein the satellite receiver is onboard an aircraft.

13. The method of claim 1, wherein the inertial sensors are implemented in an inertial measurement unit.

14. The method of claim 1, further comprising one or more additional sensors operatively connected with the processor.

15. The method of claim 6, wherein the satellite receiver is onboard an aircraft.

16. The method of claim 6, wherein the inertial sensors are implemented in an inertial measurement unit.

17. The method of claim 6, further comprising one or more additional sensors operatively connected with the processor.

* * * * *

UNITED STATES PATENT AND TRADEMARK OFFICE
CERTIFICATE OF CORRECTION

PATENT NO. : 10,018,729 B2  
APPLICATION NO. : 15/406189  
DATED : July 10, 2018  
INVENTOR(S) : Jindrich Dunik, Martin Orejas and Zdenek Kana Page 1 of 1

It is certified that error appears in the above-identified patent and that said Letters Patent is hereby corrected as shown below:

In the Claims

In Claim 3, Column 15, Line 6 change "as part of a advanced receiver" to --as part of advanced receiver--.

In Claim 6, Column 15, Lines 15-16 change "a satellite signal" to --a plurality of satellite signals--.

In Claim 9, Column 16, Line 25 change "as part of a advanced receiver" to --as part of advanced receiver--.

Signed and Sealed this  
Twelfth Day of November, 2019

Andrei Iancu  
*Director of the United States Patent and Trademark Office*